(12) United States Patent
Guldali et al.

(10) Patent No.: US 10,119,734 B2
(45) Date of Patent: Nov. 6, 2018

(54) COOLING DEVICE WITH COMPRESSOR CABINET HEATER AND A CONTROL METHOD

(75) Inventors: Yalcin Guldali, Istanbul (TR); Ertugrul Ustundag, Istanbul (TR); Sabahattin Hocaoglu, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 287 days.

(21) Appl. No.: 11/575,488

(22) PCT Filed: Nov. 2, 2005

(86) PCT No.: PCT/IB2005/053572
§ 371 (c)(1),
(2), (4) Date: Mar. 16, 2007

(87) PCT Pub. No.: WO2006/048825
PCT Pub. Date: May 11, 2006

(65) Prior Publication Data
US 2007/0214813 A1    Sep. 20, 2007

(30) Foreign Application Priority Data
Nov. 5, 2004 (TR) .................................. 2004/02985

(51) Int. Cl.
*F25B 41/00* (2006.01)
*F25B 41/04* (2006.01)
(Continued)

(52) U.S. Cl.
CPC .......... *F25B 31/002* (2013.01); *F25B 49/027* (2013.01); *F25B 5/02* (2013.01);
(Continued)

(58) Field of Classification Search
CPC .............. F25B 2500/28; F25B 2500/29; F25B 2500/31; F25B 2700/2115
(Continued)

(56) References Cited

U.S. PATENT DOCUMENTS

| 1,440,935 A | 1/1923 | See |
| 2,467,219 A | 4/1949 | Morrison |

(Continued)

FOREIGN PATENT DOCUMENTS

| DE | 4140625 A1 | 6/1993 |
| DE | 10059806 A1 | 6/2002 |

(Continued)

OTHER PUBLICATIONS

International search report and written opinion, dated Feb. 10, 2006, of corresponding International Application No. PCT/IB2005/053572; 7 pgs.

*Primary Examiner* — Ned Landrum
*Assistant Examiner* — Daniel C Comings
(74) *Attorney, Agent, or Firm* — Kilpatrick Townsend & Stockton LLP

(57) ABSTRACT

This invention relates to of a cooling device (1) comprising a compressor (2) which compresses the refrigerant fluid, a condenser (3) which enables the superheated vapor exiting the compressor (2) change to first a liquid-vapor phase then liquid phase entirely, a compressor cabinet (8) positioned separately from the cooling cabinet (7), into which the compressor (2) and the condenser (3) are positioned, one or more evaporators (4), and one or more capillary tubes (5) interposed between the compressor cabinet (8) and the evaporator (6), and a control method thereof.

19 Claims, 1 Drawing Sheet

(51) Int. Cl.
*F25D 17/06* (2006.01)
*F25D 11/00* (2006.01)
*F25D 11/02* (2006.01)
*F25B 31/00* (2006.01)
*F25B 49/02* (2006.01)
*F25B 5/02* (2006.01)
*F25B 41/06* (2006.01)

(52) U.S. Cl.
CPC ......... *F25B 41/067* (2013.01); *F25B 2500/04* (2013.01); *F25B 2500/16* (2013.01); *F25B 2500/28* (2013.01); *F25B 2500/29* (2013.01); *F25B 2500/31* (2013.01); *F25B 2600/025* (2013.01); *F25B 2600/111* (2013.01); *F25B 2700/2115* (2013.01); *F25B 2700/2116* (2013.01); *F25B 2700/21174* (2013.01); *F25B 2700/21175* (2013.01); *F25D 2700/12* (2013.01); *Y02B 30/743* (2013.01)

(58) Field of Classification Search
USPC ...... 62/181, 183, 192, 202, 203, 208, 228.1, 62/428, 440, 441, 511, 127, 226, 472; 165/293
See application file for complete search history.

(56) References Cited

U.S. PATENT DOCUMENTS

| | | | |
|---|---|---|---|
| 2,581,044 A * | 1/1952 | Ratcliff | 62/149 |
| 2,943,457 A | 7/1960 | Wile et al. | |
| 3,093,976 A | 6/1963 | Walcutt | |
| 3,705,499 A | 12/1972 | Mount et al. | |
| 4,300,357 A | 11/1981 | Jacyno | |
| 4,317,334 A | 3/1982 | Burgess et al. | |
| 5,012,652 A * | 5/1991 | Dudley | F04B 39/00 62/192 |
| 5,054,293 A | 10/1991 | Schwecke | |
| 5,150,584 A * | 9/1992 | Tomasov et al. | 62/126 |
| 5,193,358 A | 3/1993 | Winther | |
| 5,252,036 A | 10/1993 | Bunch et al. | |
| 5,265,432 A | 11/1993 | Luepke et al. | |
| 5,570,590 A | 11/1996 | Hansen et al. | |
| 5,704,219 A * | 1/1998 | Suzuki et al. | 62/222 |
| 5,970,722 A * | 10/1999 | Shibata et al. | 62/192 |
| 6,029,464 A * | 2/2000 | Kil et al. | 62/160 |
| 6,658,885 B1 | 12/2003 | Zhou et al. | |
| 2003/0000231 A1 | 1/2003 | Pokharna et al. | |
| 2003/0051494 A1 | 3/2003 | Ohya | |
| 2003/0074914 A1 | 4/2003 | Hirakanu et al. | |
| 2004/0144129 A1* | 7/2004 | Lee et al. | 62/451 |
| 2004/0172953 A1 | 9/2004 | Pritchard et al. | |

FOREIGN PATENT DOCUMENTS

| | | | |
|---|---|---|---|
| EP | 0498317 A1 | 8/1992 | |
| EP | 1119732 B1 | 12/2002 | |
| EP | 1496317 A1 | 1/2005 | |
| GB | 576921 A | 4/1946 | |
| GB | 844272 A | 8/1960 | |
| GB | 1137650 A | 12/1968 | |
| GB | 1464453 A | 2/1977 | |
| GB | 2045906 A | 11/1980 | |
| JP | H04190050 A | 7/1992 | |
| JP | H1047796 A | 2/1998 | |
| JP | 2000028237 A | 1/2000 | |
| JP | 2001227822 A | 8/2001 | |
| JP | 2004092961 A | 3/2004 | |
| SU | 1716275 A1 * | 2/1992 | F25D 21/00 |
| TR | 200003673 A2 | 7/2002 | |
| TR | 200100357 A2 | 9/2002 | |

\* cited by examiner

[Fig. 001]
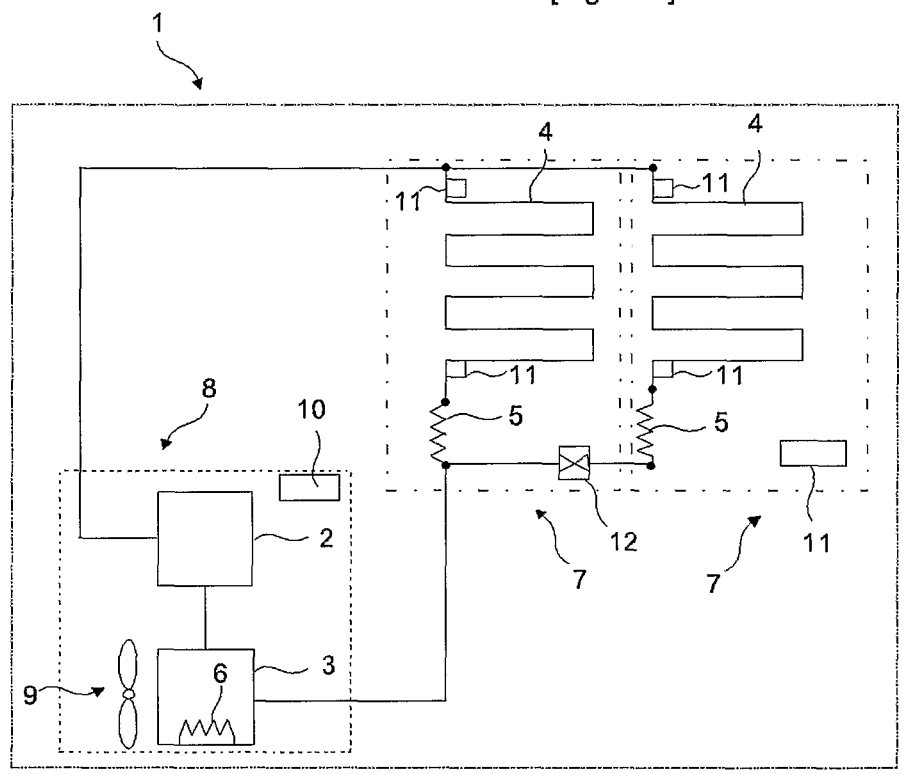
[Fig. 002]
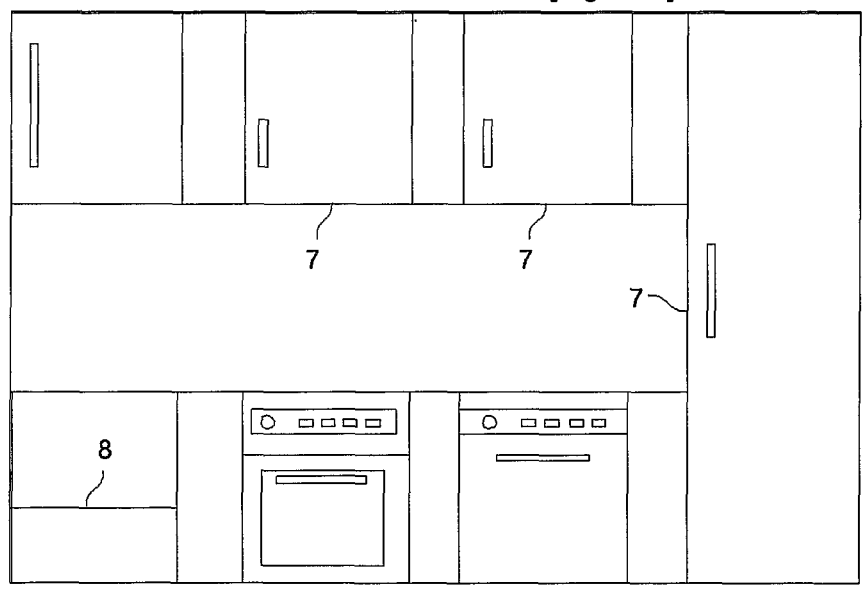

COOLING DEVICE WITH COMPRESSOR CABINET HEATER AND A CONTROL METHOD

This invention relates to a cooling device a control method thereof, the cooling cycle of which is improved.

The refrigerant in the cooling cycle is in superheated vapor phase while leaving the compressor, the refrigerant discharged in vapor phase from the compressor first changes to the liquid-vapor phase in the condenser and then to the liquid phase close to the area of the capillary tube inlet. The refrigerant starts to change toliquid-vapor phase along the capillary tube with pressure reduction and reaches the evaporator in a liquid-vapor phase with a low dryness fraction. The refrigerant which changes to vapor phase at the outlet of the evaporator due to absorption of the ambient heat reaches to the compressor again.

In "split" type cooling devices, comprising a compressor chamber including a compressor, a condenser and a fan, evaporators connected to the compressor chamber, and cooling compartments cooled by these evaporators, and wherein the compressor chamber and evaporators are positioned separately, the ambient temperature that the compressor chamber is exposed to, the temperature of the surroundings of the evaporators and the tubes interposed between the compressor chamber and the evaporator may be different. When the ambient temperature of the compressor chamber and thus the condenser is lower than a certain value compared to the ambient temperature of the evaporators, the refrigerant in the condenser quickly changes into the liquid phase. When the refrigerant enters the medium of the evaporator, the refrigerant again changes to vapor since the ambient temperature increases and the event named as "vapor block" takes place at the inlet of the capillary tube when the refrigerant in vapor phase blocks the capillary tube preventing the entrance of the refrigerant to the evaporator, disrupting the cooling cycle and subsequently resulting in the cessation of the cooling process.

Furthermore there is a certain amount of oil in the compressor which takes part in the cooling cycle for protection of movable components against high temperatures and for prevention of gas leakage from the suction and pumping cavities of the compressor. When the compressor pumps the refrigerant into the system, some amount of oil mixes with the refrigerant and leaks into the cooling cycle. Some of the oil leaked into the cooling cycle is smeared on the inner surfaces of the condenser and the evaporator; while some of it adheres to particularly the outlet portion and/or the last section of the evaporator where viscosity is very high. The greatest factor acting on motion of oil is the change in viscosity. The higher the viscosity, the harder it is for the oil to return to the condenser. The major factors affecting viscosity are temperature and solubility. The effect of solubility is greater than that of temperature, particularly at lower temperatures. The hardest part of the oil recycling in the cooling cycle is in the last coil of the evaporator and the suction line. Therefore in order to take advantage of the solubility effect at places where oil is most blocked, particularly at the outlet of the evaporator, return of oil to the compressor should be provided by enabling the double phased flow of the refrigerant and reducing viscosity. As the amount of oil leaking into the cooling cycle increases, the compressor gets devoid of oil and as a result the compressor performance decreases. Even in cases where load of the cooling compartment is low, since the compressor operating at a low rotation rate cannot reach the necessary sweeping speed, oil is blocked in the circulation line, particularly in the evaporator.

Various embodiments have been improved for both recycling the oil leaked into the cooling cycle back to the compressor and for preventing the event of "vapor block".

In the current state of the art, in European Patent no. EP1119732, a cooling device comprising a motor that changes speed in response to the temperature of the refrigerant is described.

In the current state of the art, in European Patent Application no. EP0498317, a material, which is insoluble in liquid but soluble in oil, is added into the refrigerant.

In the current state of the art, in British Patent no. GB844272, the description is given for an embodiment wherein a "vapor block" event in the cooling cycle of a refrigerator having high and low temperature compartments is created and thus each of the two compartments controlled independently.

The object of the present invention is to design a cooling device wherein the oil accumulation is reduced and the vapor block which may take place at the inlet of capillary tubes is prevented.

The cooling device designed to fulfill the objects of the present invention is illustrated in the attached figures, where:

FIG. 1—is the schematic view of a cooling device.

FIG. 2—is the schematic view of a kitchen where the cooling device is placed.

Elements shown in the figures are numbered as follows:
1. Cooling Device
2. Compressor
3. Condenser
4. Evaporator
5. Capillary Tube
6. Heater
7. Cooling Cabinet
8. Compressor Cabinet
9. Fan
10, 11. Temperature sensor
12. Valve The cooling device (1) comprises one or more cooling cabinets (7) where items to be cooled are stored, a compressor (2) which enables compression of the refrigerant, a condenser (3) which by condensing enables the superheated vapor leaving the compressor (2) to change to first liquid-vapor phase then liquid phase entirely, a compressor cabinet (8) positioned separately from the cooling cabinet (7) and into which the compressor (2) and the condenser (3) are located, one or more evaporators (4) to where the condensed fluid is delivered and absorbing the heat of the medium enabling cooling of the medium, and where the refrigerant absorbs the heat and cools the cooling cabinet (7), one or more capillary tubes (5) interposed between the compressor cabinet (8) and the evaporator (4), enabling refrigerant to be pressurized and to change to the liquid phase entirely, at least two temperature sensors (10,11) which detect the temperature inside the compressor cabinet (8) and/or the cooling cabinet (7), a fan (9) which activated or deactivated according to the difference of temperature values detected by the temperature sensors (10,11), and providing air flow over the condenser (3) and/or the compressor (2), and a heater (6) positioned in the condenser (3) and/or in the compressor cabinet (8) activated or deactivated according to the difference of temperature values detected by the temperature sensors (10,11) (FIG. 1 and FIG. 2).

One of the temperature sensors (10) is positioned in the compressor cabinet (8) and/or on the condenser (3) and detects the temperature inside the compressor cabinet (8) and/or in the condenser (3), the other temperature sensor (11) is positioned in the cooling cabinet (7) and detects the temperature of the cooling cabinet (7). Thermostats may be used as temperature sensors (10,11). In an alternative embodiment of the present invention, the temperature sensor (11) can be positioned at the inlet of the capillary tube (5) at the end of the pumping line.

The cooling device (1) comprises one or more valves (12) particularly solenoid valves (12) providing the directing of the fluid exiting the capillary tube (5) to the evaporators (4) consequently to the cooling cabinet (7) by opening and closing mechanically or electrically.

In the cooling device (1) which is the object of the present invention, the compressor (2) compresses the refrigerant and delivers it to the condenser (3) as superheated vapor. The heat of the refrigerant is released at the condenser (3) with the forced air flow created by the fan (9) and the refrigerant gradually changes to the liquid-vapor phase and then the liquid phase entirely. The refrigerant fluid leaving the compressor cabinet (8) enters the capillary tube (5) and the evaporator (4) which are in a medium having a different ambient temperature value than that of the compressor cabinet (8). If the difference of the temperature values detected by the temperature sensors (10,11) in the compressor cabinet (8) and the cooling cabinet (7) is greater than a certain value, then the fan (9) in the compressor cabinet (8) is deactivated and the refrigerant fluid reaches a certain condensation temperature and pressure value. After a certain time period the temperature values detected by the temperature sensors (10,11) in the compressor cabinet (8) and the cooling cabinet (7) are controlled and if the difference between the two mediums are greater than a certain value, then the heater (6) in the compressor cabinet (8) is activated. In this manner the condensation temperature and consequently the pressure of the refrigerant is brought to a desired value while the refrigerant is kept in the liquid phase and the event of "vapor block" constituted by the refrigerant changing to the vapor phase entirely at the inlet of the capillary tube (5) is prevented. The refrigerant passing through the capillary tube (5) with reduced temperature and pressure enters the evaporator (4) with ease and the refrigerant absorbs the heat of the cooling cabinet (7), cooling the cooling cabinet (7), and due to the absorbed heat the refrigerant fluid quickly changes to the vapor phase as it passes through the outlet or last coil of the evaporator (4). The refrigerant leaving the evaporator (4) reaches the compressor (2) in vapor phase and completes one cooling cycle.

In another embodiment of the present invention, the temperature values detected by the temperature sensor (11) positioned at only the inlet and/or outlet of the evaporator (4) are evaluated. If the difference between the inlet and outlet of the evaporator (4) temperature values is greater than the preset values, then the refrigerant is in superheated vapor phase at the outlet of the evaporator (4), in order to start double phase flow at the evaporator (4) outlet, firstly the compressor (2) rotation rate is increased, thus increasing the compressor (2) sweeping speed of the oil in the circulation line, particularly in the evaporator (4) and at the end of this process if double phase flow can not be accomplished, the fan (9) is deactivated and then the heater (8) in the compressor cabinet (8) and/or in the condenser (3) is activated thus starting double phase flow of the refrigerant fluid at the outlet of the evaporator (4). In this manner, both the oil sweeping speed of the compressor (2) and the temperature at the outlet of the evaporator (4) increases due to the balancing of the pressure, and since the amount of fluid soluble in oil increases, viscosity decreases, and this low viscosity oil recycles back to the compressor (2) in a shorter period of time.

With the cooling device (1) of the present invention, the unintentional creation of "vapor block" at the inlet of capillary tube (5) is prevented, and especially in "split" type cooling devices, by positioning the evaporators (4) and the compressor cabinet (8) comprising the compressor (2), the condenser (3) and the fan (9) at locations having different temperature values the compressor cabinet (8) is provided to be removed to a different external emplacement than that of the cooling cabinet (7). Furthermore the oil that leaks into the circulation line from the compressor (2) is allowed to return back to the compressor (2).

The invention claimed is:

1. A cooling device comprising:
   one or more cooling cabinets in which items to be cooled are stored,
   a compressor cabinet external to the one or more cooling cabinets, the compressor cabinet including:
      a compressor which compresses a refrigerant into a superheated vapor, and
      a condenser which receives the superheated vapor from the compressor and by condensing enables the superheated vapor to change to first a liquid-vapor phase, then a liquid phase such that the entire superheated vapor forms a condensed fluid,
   one or more evaporators provided in the one or more cooling cabinets to which the condensed fluid is delivered, wherein the one or more evaporators enable cooling of the one or more cooling cabinets by the condensed fluid flowing through the one or more evaporators absorb heat of the one or more cooling cabinets,
   a first temperature sensor that detects a temperature inside the compressor cabinet,
   a second temperature sensor that detects a temperature inside the one or more cooling cabinets,
   and
   a heater positioned in the compressor cabinet which is activated when a difference between a first temperature value detected by the first temperature sensor and a second temperature value detected by the second temperature sensor is greater than a predetermined value to prevent formation of vapor block.

2. The cooling device as in claim 1, further comprising a fan which provides air flow over the condenser and/or the compressor which is activated or deactivated according to the difference between the first temperature value detected by the first temperature sensor and the second temperature value detected by the second temperature sensor.

3. The cooling device as in claim 1, wherein the first temperature sensor is positioned on the condenser and detects the temperature of the condenser.

4. The cooling device as in claim 1, wherein the first temperature sensor is positioned on the compressor and detects the temperature of the compressor.

5. The cooling device as in claim 1, wherein the second temperature sensor is positioned at a refrigerant inlet of the one or more evaporators and a third temperature sensor is positioned at a refrigerant outlet of the one or more evaporators detecting the temperatures at the refrigerant inlet and outlet of the one or more evaporators.

6. The cooling device as in claim 5, wherein the cooling device is configured to:
   increase a rotation rate of the compressor,
   when double phase flow cannot be accomplished, deactivate a fan and activate the heater if the difference between the refrigerant inlet and outlet temperature values of the evaporator is greater than a certain value, thereby reducing viscosity by increasing a refrigerant amount soluble in oil by enabling the double phase flow of the refrigerant, and provide low viscosity oil to recycle back to the compressor.

7. The cooling device as in claim 1, wherein the second temperature sensor is positioned at an inlet of a capillary tube provided at an end of a pumping line.

8. The cooling device as in claim 1, wherein the cooling device is configured to:

deactivate a fan and activate the heater if the difference between the first temperature value detected by the first temperature sensor and the second temperature value detected by the second temperature sensor is greater than a certain value, bringing a condensation temperature of the refrigerant and consequently a pressure to a desired value, and preventing formation of vapor block at an inlet of a capillary tube provided at an end of a pumping line.

9. The cooling device as in claim 1, wherein the heater is activated to increase a condensation temperature of the refrigerant in order to prevent formation of vapor block when the refrigerant enters the one or more cooling cabinets.

10. A cooling device comprising:

a cooling cabinet in which items to be cooled are stored, a compressor cabinet external to the cooling cabinet, the compressor cabinet including:

a compressor which compresses a refrigerant into a superheated vapor, and a condenser which receives the superheated vapor from the compressor and by condensing enables the superheated vapor to change to first a liquid-vapor phase, then a liquid phase such that the entire superheated vapor forms a condensed fluid, an evaporator provided in the cooling cabinet to which the condensed fluid is delivered, wherein the evaporator enables cooling of the cooling cabinet by the condensed fluid flowing through the evaporator absorb heat of the cooling cabinet, a first temperature sensor that detects a temperature at an inlet of the evaporator, a second temperature sensor that detects a temperature at an outlet of the evaporator such that a rotation rate of the compressor is increased according to a difference between a first temperature value detected by the first temperature sensor and a second temperature value detected by the second temperature sensor in order to start double phase flow, a fan which provides air flow over the condenser and/or the compressor, and a heater positioned in the compressor cabinet which is activated when the difference between the first temperature value detected by the first temperature sensor and the second temperature value detected by the second temperature sensor is greater than a predetermined value to prevent formation of vapor block.

11. The cooling device as in claim 10, wherein the fan which provides air flow over the condenser and/or the compressor is deactivated if the double phase flow cannot be started.

12. The cooling device as in claim 11, wherein the heater is activated if the double phase flow cannot be started.

13. The cooling device as in claim 12, wherein the first temperature sensor is positioned at an inlet of a capillary tube provided at an end of a pumping line.

14. A cooling device comprising:

two or more cooling cabinets in which items to be cooled are stored, a compressor cabinet external to the two or more cooling cabinets, the compressor cabinet including:

a compressor which compresses a refrigerant into a superheated vapor, and a condenser which receives the superheated vapor from the compressor and by condensing enables the superheated vapor to change to first a liquid-vapor phase, then a liquid phase such that the entire superheated vapor forms a condensed fluid, two or more evaporators provided in the two or more cooling cabinets to which the condensed fluid is delivered, wherein the two or more evaporators enable cooling of the two or more cooling cabinets by the condensed fluid flowing through the two or more evaporators absorb heat of the two or more cooling cabinets, a first temperature sensor that detects a temperature inside the compressor cabinet, a second temperature sensor that detects a temperature inside the two or more cooling cabinets, and a heater positioned in the compressor cabinet which is activated when a difference between a first temperature value detected by the first temperature sensor and a second temperature value detected by the second temperature sensor is greater than a predetermined value to prevent formation of vapor block.

15. The cooling device as in claim 14, further comprising a fan which provides air flow over the condenser and/or the compressor, wherein the fan is activated or deactivated according to the difference between the first temperature value detected by the first temperature sensor and the second temperature value detected by the second temperature sensor.

16. The cooling device as in claim 14, wherein the first temperature sensor is positioned on the condenser and detects the temperature of the condenser.

17. The cooling device as in claim 14, wherein the first temperature sensor is positioned on the compressor and detects the temperature of the compressor.

18. The cooling device as in claim 14, wherein the second temperature sensor is positioned at a refrigerant inlet of the two or more evaporators and a third temperature sensor is positioned at a refrigerant outlet of the two or more evaporators detecting the temperatures at the refrigerant inlet and outlet of the two or more evaporators.

19. The cooling device as in claim 14, wherein the second temperature sensor is positioned at an inlet of a capillary tube provided at an end of a pumping line.

* * * * *